(12) United States Patent
Wang et al.

(10) Patent No.: US 11,105,774 B2
(45) Date of Patent: Aug. 31, 2021

(54) LIGHT-ASSISTED QUARTZ CRYSTAL MICROBALANCE AND MEASUREMENT METHOD THEREOF

(71) Applicant: Jiangsu University, Jiangsu (CN)

(72) Inventors: Jie Wang, Jiangsu (CN); Lei Liu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 16/763,231

(22) PCT Filed: Dec. 13, 2017

(86) PCT No.: PCT/CN2017/115776
§ 371 (c)(1),
(2) Date: May 12, 2020

(87) PCT Pub. No.: WO2019/109368
PCT Pub. Date: Jun. 13, 2019

(65) Prior Publication Data
US 2021/0072188 A1      Mar. 11, 2021

(30) Foreign Application Priority Data

Dec. 7, 2017   (CN) .......................... 201711285232.6

(51) Int. Cl.
*G01N 29/02*   (2006.01)
*G01N 29/036*  (2006.01)
*G01N 29/22*   (2006.01)

(52) U.S. Cl.
CPC ......... *G01N 29/022* (2013.01); *G01N 29/036* (2013.01); *G01N 29/222* (2013.01);
(Continued)

(58) Field of Classification Search
CPC ..... G01N 2291/014; G01N 2291/0426; G01N 29/022; G01N 29/036; G01N 29/222
See application file for complete search history.

(56) References Cited

U.S. PATENT DOCUMENTS 6,544,478 B1 *  4/2003  Oyama ..................... G01G 3/13
                                                       422/68.1
7,329,536 B2 *  2/2008  Zeng .................. C07K 16/4283
                                                        310/311
(Continued)

FOREIGN PATENT DOCUMENTS

CN          101163957       4/2008
CN          103196769       7/2013
(Continued)

*Primary Examiner* — Francis C Gray
(74) *Attorney, Agent, or Firm* — JCIP Global Inc.

(57) ABSTRACT

A novel light-assisted quartz crystal microbalance and a measurement method thereof. The microbalance comprises a QCM/QCM-D chip, an oscillation circuit, a frequency counter, a computer, a reaction chamber, and a light source. Light emitted from the light source is able to irradiate a surface of the QCM/QCM-D chip. By additionally configuring a light source with the ability to irradiate a chip surface, when irradiated the surface of the QCM/QCM-D chip changes properties thereof, and irradiation of the surface of the QCM/QCM-D chip greatly increases the resonance frequency. Correspondingly, irradiation of the surface of the chip also changes mechanical properties and piezoelectric characteristics of quartz crystal, thereby effectively improving measurement sensitivity of a quartz crystal microbalance apparatus system.

11 Claims, 3 Drawing Sheets

(52) U.S. Cl.
CPC ............. *G01N 2291/014* (2013.01); *G01N 2291/0426* (2013.01)

(56) References Cited

U.S. PATENT DOCUMENTS

| | | | | |
|---|---|---|---|---|
| 7,869,013 | B2* | 1/2011 | Wang | G01N 21/553 |
| | | | | 356/73 |
| 7,930,923 | B2* | 4/2011 | Patel | G01N 33/0047 |
| | | | | 73/23.34 |
| 2012/0262718 | A1* | 10/2012 | Yamada | G01N 21/554 |
| | | | | 356/436 |
| 2017/0260629 | A1* | 9/2017 | Lecordier | C23C 16/52 |
| 2018/0299410 | A1* | 10/2018 | Merrill | G01N 29/00 |

FOREIGN PATENT DOCUMENTS

| | | |
|---|---|---|
| CN | 204694582 | 10/2015 |
| CN | 106092802 | 11/2016 |
| CN | 107290240 | 10/2017 |
| CN | 107917955 | 4/2018 |
| DE | 10024366 | 1/2002 |

* cited by examiner

LIGHT-ASSISTED QUARTZ CRYSTAL MICROBALANCE AND MEASUREMENT METHOD THEREOF

CROSS-REFERENCE TO RELATED APPLICATION

This application is a 371 of international application of PCT application serial no. PCT/CN2017/115776, filed on Dec. 13, 2017, which claims the priority benefit of China application no. 201711285232.6, filed on Dec. 7, 2017. The entirety of each of the above mentioned patent applications is hereby incorporated by reference herein and made a part of this specification.

TECHNICAL FIELD

The invention relates to the technical field of instruments and meters, in particular to a novel light-assisted quartz crystal microbalance and a detection method thereof.

BACKGROUND ART

Pierre and Jacques Curie found in 1880 that a polarization effect occurred inside a quartz crystal, i.e., positive charges and negative charges accumulated on the opposite surfaces of the quartz crystal respectively, when the quartz crystal was deformed in a certain direction under external force. Later, Gabriel Lippman proposed that an electromagnetic field might be used to generate stress in crystals. This argument was confirmed by subsequent experimental results.

The following equation was concluded from the research of Professor Sauerbrey to describe the relationship between the resonant frequency of the quartz crystal and the surface quality of the chip, i.e., the Sauerbrey equation, which has been applied to guide various applications of quartz crystal microbalances.

$$\Delta f = \frac{-2 f_0^2 \Delta m}{A \sqrt{\mu_q \rho_q}}$$

Where $\Delta f$ is the frequency variation (Hz), $\Delta m$ is the variation of the surface quality of the chip (g), $f_0$ is the resonant frequency of the QCM chip (Hz), A is the area of the reactive-electrode of the QCM chip (cm$^2$), $\rho_q$ is the density (2.65 g/cm$^3$), and $\mu_q$ is the shear modulus.

Quartz crystal microbalances (QCM) are widely used in various fields, such as monitoring surface thickness in vacuum. This application also greatly expands the application of quartz crystal microbalances as sensors in other fields, such as detection of atmospheric pollutants, metal corrosion and protection, phase transition of polymers, and biosensing detection, etc.

Quartz crystal microbalances are a powerful label-free detection technique, and have received more and more attention in various fields. However, quartz crystal microbalances are under development compared with another label-free detection technique—surface plasma resonance (SPR). One of the important reasons for the great commercial success of the SPR technique is that the detection sensitivity of a SPR system is generally higher than that of a quartz crystal microbalance. The sensitivity of a 5 MHz quartz crystal microbalance is about 20 times lower than that of the corresponding SPR system. In some applications, such as small molecule interaction detection and trace detection, the signals of a quartz crystal microbalance are not strong enough to obtain relevant information of the detection object.

The sensitivity of a quartz crystal microbalance is defined as the mass change on unit surface area of a QCM chip corresponding to certain signal change. The detection sensitivity is related with the density of the surface detection object, the inherent resonant frequency of the chip, and the shear modulus. According to the Sauerbrey equation, for a 5 MHz AT-cut quartz crystal microbalance chip, the detection sensitivity is about 17.7 ng/cm$^2$ for 1 Hz of frequency variation.

Increasing the resonant frequency of a quartz crystal microbalance chip can promote the improvement of the detection sensitivity of the quartz crystal microbalance, but will lead to higher requirements for the manufacturing of ultra-thin quartz crystal chips, because ultra-thin quartz crystal chips are very fragile. Therefore, there are some limitations on improving the detection sensitivity by reducing the thickness of the quartz crystal chip. Owing to these limitations, at present, most manufacturers of quartz crystal microbalances improve the resolution of the detection signals by optimizing the circuits, and finally reduce the limit of detection (LOD), which is the minimum detectable changing value of the concentration or mass of the detection object, and is related with the detection sensitivity and the accuracy of the signals.

The LOD of a quartz crystal microbalance is lower than 1 ng/cm$^2$, and such a LOD can't fully meet the application requirements. For example, in the detection of objects of clinical diagnosis, the concentration of the detection objects is at ng/mL level. Therefore, it is an urgent task to improve the sensitivity and LOD of quartz crystal microbalances.

CONTENTS OF THE INVENTION

In view of the drawbacks in the prior art, the present invention intends to provide a quartz crystal microbalance system which has higher detection sensitivity without reducing the thickness of the chip and causing chip breakage, and a detection method thereof; besides, the present invention can also improve the detection sensitivity of the quartz crystal microbalance system.

The above technical object of the present invention is attained with the following technical means:

A novel light-assisted quartz crystal microbalance, comprising the following parts:

a QCM/QCM-D chip, which has a sandwich structure formed by a quartz crystal wafer sandwiched between two pieces of electrodes, wherein the chip and the electrode circuit are encapsulated by a metal, ceramic or plastic shell and form a reaction chamber, and the chip and the shell integrally form a quartz crystal resonator;

an oscillation circuit for providing an alternating electric field for the quartz crystal in the QCM/QCM-D chip;

a frequency counter for monitoring the resonant frequency of the QCM/QCM-D chip;

a light source capable of irradiating light on the surface of the QCM/QCM-D chip.

Furthermore, the light source is a light source having one or more frequencies.

Furthermore, a grating unit is arranged between the light source and the QCM/QCM-D chip, and is configured to control the irradiation of the light from the light source on the surface of the QCM/QCM-D chip.

Furthermore, the grating unit comprises a movable grating baffle and a driver capable of moving the grating baffle.

Furthermore, the grating baffle is a removable grating baffle, and the driver is an electric driver.

Furthermore, the novel light-assisted quartz crystal microbalance also contains a computer, which is connected with the driver of the grating baffle, the oscillation circuit and the frequency counter, and is configured to control the operation of the driver of the grating baffle to move the grating baffle, to control the on-off of the oscillation circuit and parameters of electric field, to read the data collected by the frequency counter, and to obtain the change of the resonant frequency of the QCM/QCM-D chip in the detection process.

Furthermore, the wavelength range of the light generated by the light source is 100-800 nm, preferably is 200-400 nm.

A detection method of the novel light-assisted quartz crystal microbalance, comprising the following steps:

step 1: operating the quartz crystal microbalance system, and acquiring a stable baseline of the resonant frequency of the QCM/QCM-D chip via the frequency counter;

step 2: turning on the switch of the light source to irradiate light to the surface of the QCM/QCM-D chip, and obtaining the resonant frequency of the QCM/QCM-D chip as signal 1 via the frequency counter;

step 3: stopping the irradiation of the light from the light source on the surface of the QCM/QCM-D chip;

step 4: pushing the object to be detected to the surface of the QCM/QCM-D chip, then making the light irradiate on the surface of the QCM/QCM-D chip, obtaining the resonant frequency of the QCM/QCM-D chip as signal 2 via the frequency counter, and comparing the difference between the signal 1 and the signal 2.

Furthermore, the grating unit is arranged between the light source and the QCM/QCM-D chip, so as to control irradiation of the light from the light source on the surface of the QCM/QCM-D chip.

Furthermore, the detection method of the quartz crystal microbalance is applicable to gas and liquid detection objects, and the quartz crystal resonator is used for accommodating the gas or liquid in the environment in which the detection object is located and the detection object.

In the present invention, a light source capable of irradiating light to the surface of the chip is additionally arranged, the surface properties of the QCM/QCM-D chip are changed under the light irradiation, and a water molecule layer absorbed on the surface of the QCM/QCM-D chip is reversibly desorbed from the electrode surface of the QCM/QCM-D chip; the irradiation of the light from the light source on the surface of the QCM/QCM-D chip can cause sharp rise of the resonant frequency. Accordingly, the light irradiation on the surface of the chip also causes changes of the mechanical properties and piezoelectric properties of the quartz crystal, and thereby the detection sensitivity of the quartz crystal microbalance system is effectively improved.

In addition, a grating unit is used to control the irradiation of the light from the light source on the surface of the chip. Compared with a light irradiation control scheme that simply relies on switching on/off the light source, the grating unit can quickly, effectively and accurately control the light irradiation on the surface of the QCM/QCM-D chip. The detection objects may include compounds of different concentrations and different kinds and cover various chemicals and biomolecules, such as tumor diagnostic markers.

2—Novel Light-Assisted Quartz Crystal Microbalance; 4—Computer; 6—Light Source; 8—Grating Baffle; 10—Grating Unit; 12—Light; 14—Reaction Chamber; 16—Quartz Crystal Wafer Layer in the QCM/QCM-D Chip; 18—Groove; 20—QCM/QCM-D Chip; 22—Frequency Counter.

EMBODIMENTS

Hereunder the present invention will be further detailed in specific examples with reference to the accompanying drawings, but the protection scope of the present invention is not limited thereto.

Figure 1:
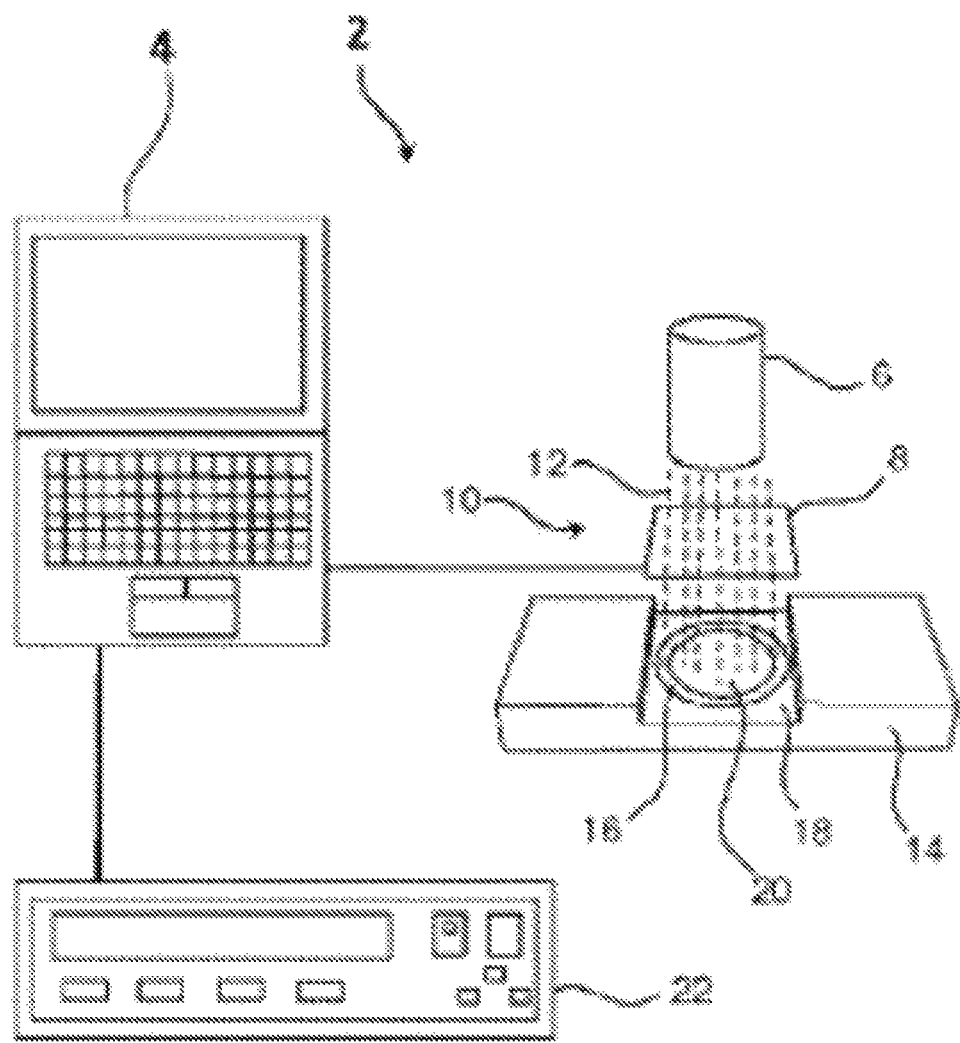
FIG. 1 is a schematic diagram of the QCM sensor system according to the present invention.

As shown in FIG. 1, the novel light-assisted quartz crystal microbalance 2 according to the present invention comprises a quartz crystal microbalance/quartz crystal microbalance with dissipation (QCM/QCM-D) chip, which has a sandwich structure that is formed by a quartz crystal wafer layer 16 sandwiched between two pieces of electrodes, wherein the chip and the electrode circuit are encapsulated by a metal, ceramic or plastic shell and form a reaction chamber 14, the chip and the shell integrally form a quartz crystal resonator, and the QCM/QCM-D chip 20 is installed in a groove 18 at the bottom surface of the reaction chamber 14, the reaction chamber 14 is used for accommodating the gas or liquid in the environment in which the detection object is located and the detection object; an oscillation circuit for providing an alternating electric field for the quartz crystal wafer layer 16 in the QCM/QCM-D chip 20; a frequency counter 22 for monitoring the resonant frequency of the QCM/QCM-D chip 20; and a light source 6 capable of irradiating light 12 on the surface of the QCM/QCM-D chip 20. The light source 6 is a light source having one or more frequencies, and can generate light within a wavelength range of 100-800 nm, preferably 200-400 nm, such as 365 nm. A better effect can be attained if the frequency of the light emitted from the light source 6 is lower or the energy and power of the irradiated emitted light are higher.

Under the irradiation of the light 12 emitted from the light source 6, the surface properties of the QCM/QCM-D chip 20 are changed, and the water molecules absorbed on the surface of the QCM/QCM-D chip are reversibly desorbed from the surface of the QCM/QCM-D chip 20, thus the resonant frequency of the QCM/QCM-D chip is increased. Accordingly, the light irradiation on the surface of the chip also causes changes of the mechanical properties and piezoelectric properties of the quartz crystal in the chip, and thereby the detection sensitivity of the equipment system of the quartz crystal microbalance 2 is effectively improved. By applying the light source 6, the sensitivity of the system of the quartz crystal microbalance 2 can be improved by ten times or more.

Furthermore, the novel light-assisted quartz crystal microbalance 2 comprises a grating unit 10 disposed between the light source 6 and the QCM/QCM-D chip 20 for controlling the irradiation of the light 12 from the light source 6 on the surface of the QCM/QCM-D chip 20. The grating unit 10 comprises a movable grating baffle 8 and a driver for changing the position of the baffle 8. A variety of drivers are available, and an electric driver can be selected. The grating baffle 8 is removable. The grating baffle 8 can provide more protection and block the irradiation of the light emitted from the light source 6 on the surface of the QCM/QCM-D chip 20. The driver is advantageously controlled by a control unit installed in the computer 4.

The opening or closing of the grating unit 10 can be controlled by the computer 4 connected to the grating unit 10 through the software installed on the computer 4, so as to control the light 12 irradiating the surface of the QCM/QCM-D chip 20.

The computer 4 is connected to the reaction chamber 14 of the quartz crystal resonator and the frequency counter 22 to control the oscillation circuit and electric field parameters, read the data collected by the frequency counter 22, and to obtain the change of the resonant frequency of the QCM/QCM-D chip in the detection process.

The detection method of the novel light-assisted quartz crystal microbalance 2 according to the present invention comprises the following steps:

step 1: operating the system of the quartz crystal microbalance 2, and acquiring a stable baseline of the resonant frequency of the quartz crystal in the QCM/QCM-D chip 20 via the frequency counter 22;

step 2: turning on the switch of the light source 6 to irradiate light to the surface of the QCM/QCM-D chip 20, and obtaining the resonant frequency of the quartz crystal of the QCM/QCM-D chip 20 as signal 1 via the frequency counter 22;

step 3: stopping the irradiation of the light from the light source 6 on the surface of the QCM/QCM-D chip 20;

step 4: pushing the object to be detected to the surface of the QCM/QCM-D chip 20, then making the light 12 irradiate on the surface of the QCM/QCM-D chip 20, obtaining the resonant frequency of the QCM/QCM-D chip 20 as signal 2 via the frequency counter 22, and comparing the difference between the signal 1 and the signal 2.

Preferably, in the detection process, the grating unit 10 is arranged between the light source 6 and the QCM/QCM-D chip 2 to control irradiation of the light 12 of the light source 6 on the surface of the QCM/QCM-D chip 20. With the use of grating unit 10, the irradiation of the light on the surface of the QCM/QCM-D chip 20 can be controlled quickly, effectively and accurately, and the grating unit 10 is much faster and more efficient than a simple control scheme that simply relies on the on-off control of the light source 6. The detection method can be performed in gas or liquid state, and the chamber 12 is used for accommodating the gas or liquid in the environment in which the detection object is located and the detection object. The detected objects can include compounds of different concentrations and different kinds and cover various chemicals and biomolecules, such as tumor diagnostic markers.

Figure 2A:
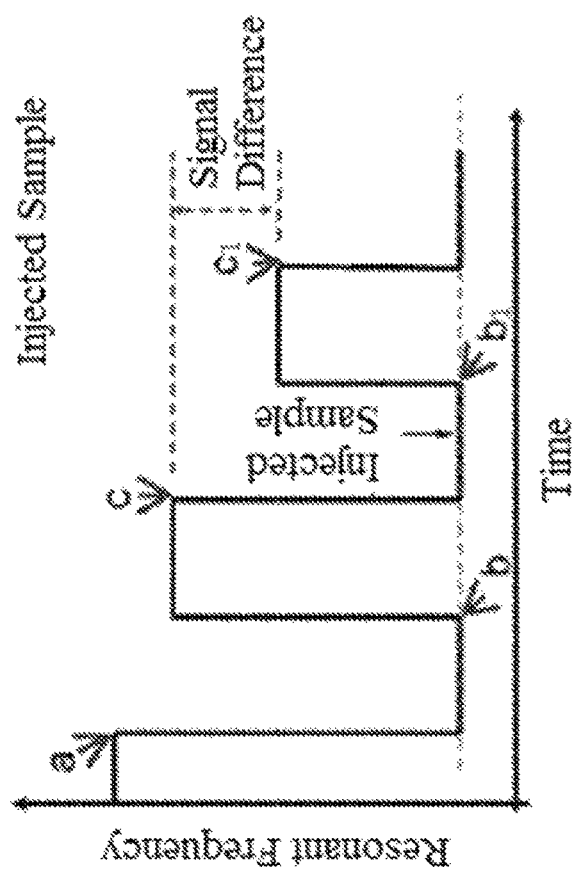
In FIG. 2A is a schematic diagram of the general process of detecting PBS solutions at different concentrations flowing across the surface of the chip with a curve of QCM resonant frequency which changes over time under the switching control of the grating unit.
Figure 2B:
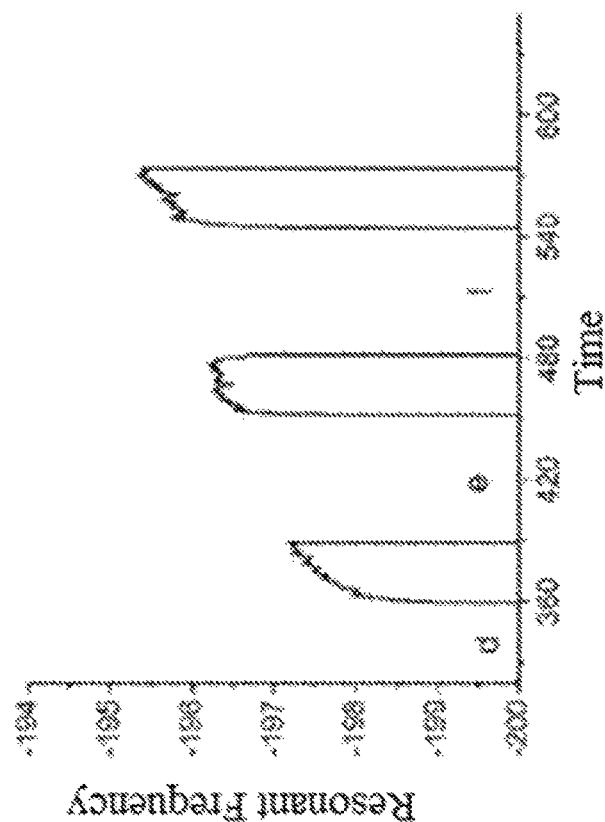
FIG. 2B is a data graph for detecting PBS solutions at different concentrations flowing across the surface of the chip as the QCM resonant frequency changes over time, with the light irradiating on the surface of the QCM/QCM-D chip under switch control of the grating unit.

FIG. 2A is a schematic diagram showing the general process of detecting a liquid sample with the novel light-assisted quartz crystal microbalance 2 according to the present invention on the basis of the change of the resonant frequency of the quartz crystal over time, when the grating unit 10 is turned on and off. Time a represents the operation of "injecting water" to the surface of the QCM/QCM-D chip 20. Before water is injected, the resonant frequency of the quartz crystal is the highest, and only air exists on the surface of the QCM/QCM-D chip 20 in this period. After water is injected to the surface of the QCM/QCM-D chip 20, the frequency will drop to a lower value. Time b represents the operation of "opening the grating". After the grating is opened, the light from the light source 6 irradiates on the surface of the QCM/QCM-D chip 20, and the resonant frequency of the quartz crystal increases. Time c represents the operation of "closing the grating". When the grating is closed, the resonant frequency of the quartz crystal drops to a lower level. Then, a sample of the detection object is injected to the surface of the QCM/QCM-D chip 20. After that, at time b1, when the grating is opened again, the resonant frequency increases to a medium level due to the light irradiation on the surface of the QCM/QCM-D chip 20. When the grating is finally closed at time c1, the resonant frequency of the quartz crystal drops to a lower value again. By comparing the difference between the resonant frequencies after the grating unit is opened in the two times, relevant information of the detection object can be analyzed. FIG. 2B is a data graph for detecting the change of concentration of phosphate buffer solutions (PBS) at different concentrations by the novel light-assisted quartz crystal microbalance 2 according to the present invention, wherein the resonant frequency changes with time (unit: minute). Initially, at time d, 0.08 mmol/L PBS buffer solution is injected to the surface of the QCM/QCM-D chip 20. The irradiation 28 on the surface of the QCM/QCM-D chip 20 causes the increase of the resonant frequency of the chip, and then the resonant frequency decreases after the irradiation is cut off. Then, at time e, 0.016 mmol/L PBS buffer solution is injected to the surface of the QCM/QCM-D chip 20. The grating unit 10 is opened again for irradiation. It can be seen that the irradiation 28 on the surface of the QCM/QCM-D chip 20 causes the increase of the resonant frequency of the quartz crystal. After that, the irradiation is cut off, consequently the resonant frequency decreases again. Then, as shown at time f, pure water is injected to the surface of the QCM/QCM-D chip 20, and the grating unit 10 is opened for irradiation. It can be seen that the irradiation 28 on the surface of the QCM/QCM-D chip 20 causes the increase of the resonant frequency of the chip. Finally, after the light irradiation on the surface of the QCM/QCM-D chip 20 is cut off, the resonant frequency of the QCM/QCM-D chip 20 decreases again.

FIG. 2B shows that the light irradiation on the surface of the QCM/QCM-D chip 20 can be utilized to enhance the resonant frequency signal (frequency 28) of the quartz crystal, so as to detect the concentration change of PBS buffer solution at low concentration. It can be seen from the data graph: when 0.08 mmol/L PBS buffer solution is switched to 0 mmol/L PBS buffer solution (i.e., pure water), the resonant frequency curve increases by about 2.4 Hz; especially when the detection object −0.016 mmol/L PBS buffer solution is switched to pure water, the resonant frequency curve increases by about 1 Hz.

Figure 3:
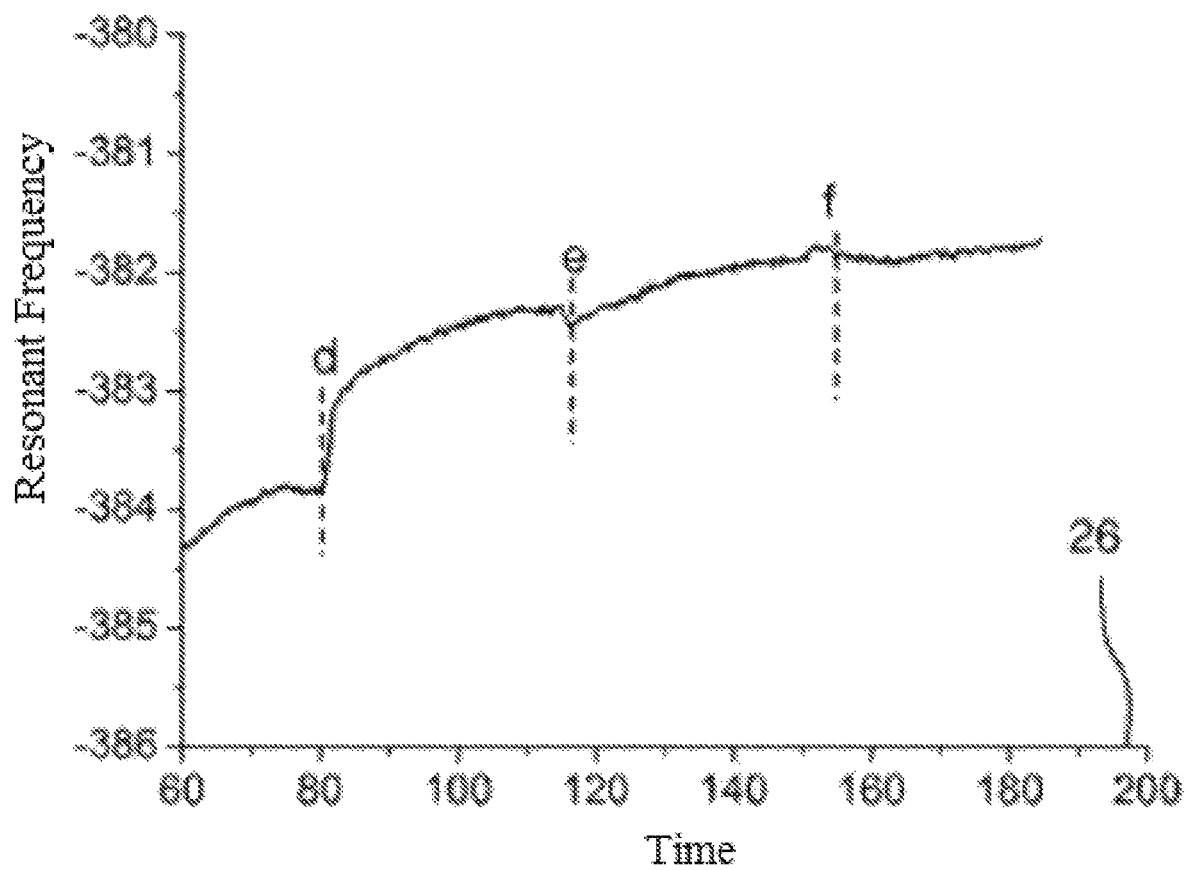
FIG. 3 is a data graph for detecting PBS solutions at different concentrations flowing across the surface of the chip as the curve of the QCM/QCM-D resonant frequency changes over time, without light irradiation on the surface of the QCM/QCM-D chip.

FIG. 3 is a data graph showing the change of the resonant frequency signal 28 of the QCM/QCM-D chip 20 over time when the same PBS buffer solution shown in FIG. 2B is injected as the detection object, without irradiation on the surface of the QCM/QCM-D chip 20. It can be seen: when 0.08 mmol/L PBS buffer solution is injected at time d, the resonant frequency increases slightly. Then, as shown at time e, when 0.016 mmol/L PBS buffer solution is injected, the resonant frequency of the quartz crystal further increases slightly; after that, as shown at time f, when pure water is injected for detection, the resonant frequency changes indiscernibly. It can be seen from the data graph: when 0.08 mmol/L PBS buffer solution is switched to 0 mmol/L PBS buffer solution (i.e., pure water), the resonant frequency curve increases by about 1 Hz; especially when the detection object is switched from 0.016 mmol/L PBS buffer solution to pure water, the change of the resonant frequency is indiscernible.

FIG. 3 shows that the resonant frequency change of the quartz crystal resulted from 0.08 mmol/L PBS buffer solution, 0.016 mmol/L PBS buffer solution and 0 mmol/L PBS buffer solution (pure water) is too small to be detected, after the irradiation on the surface of the QCM/QCM-D chip 20 is cut off. Therefore, the change of the resonant frequency of traditional quartz crystal is not enough to distinguish the concentration change of 0.08 mmol/L, 0.016 mmol/L and 0 mmol/L. Hence, the sensitivity of the system is improved with the application of irradiation.

While above examples are preferred embodiments of the present invention, the present invention is not limited to those embodiments. Any obvious improvement, replacement, or variation that can be made by those skilled in the art without departing from the spirit of the present invention shall be deemed as falling in the protection scope of the present invention.

What is claimed is:

1. A novel light-assisted quartz crystal microbalance, comprising the following parts:
    a quartz crystal microbalance/quartz crystal microbalance with dissipation (QCM/QCM-D) chip, which has a sandwich structure formed by a quartz crystal wafer layer sandwiched between two pieces of electrodes, wherein the chip and the electrode are encapsulated by a metal, ceramic or plastic shell and form a reaction chamber, and the chip and the shell integrally form a quartz crystal resonator;
    an oscillation circuit for providing an alternating electric field for the quartz crystal in the QCM/QCM-D chip;
    a frequency counter for monitoring the resonant frequency of the QCM/QCM-D chip;
    a light source capable of irradiating light on a surface of the QCM/QCM-D chip.

2. The novel light-assisted quartz crystal microbalance according to claim 1, wherein the light source is a light source having one or more frequencies.

3. The novel light-assisted quartz crystal microbalance according to claim 1, wherein a grating unit is arranged between the light source and the QCM/QCM-D chip, and is configured to control an irradiation of the light from the light source on the surface of the QCM/QCM-D chip.

4. The novel light-assisted quartz crystal microbalance according to claim 1, wherein the grating unit comprises a movable grating baffle and a driver capable of moving the grating baffle.

5. The novel light-assisted quartz crystal microbalance according to claim 4, wherein the grating baffle is a removable grating baffle, and the driver is an electric driver.

6. The novel light-assisted quartz crystal microbalance according to claim 1, wherein the novel light-assisted quartz crystal microbalance further comprises a computer, which is connected with the driver of the grating baffle, the oscillation circuit, and the frequency counter, and is configured to control the operation of the driver of the grating baffle to move the grating baffle, to control the on-off of the oscillation circuit and electric field parameters, to read data collected by the frequency counter, and to obtain the change of the resonant frequency of the QCM/QCM-D chip in the detection process by comparison.

7. The novel light-assisted quartz crystal microbalance according to claim 1, wherein a wavelength range of the light generated by the light source is 100-800 nm.

8. A detection method of the novel light-assisted quartz crystal microbalance according to claim 1, wherein comprising the following steps:
    step 1: operating the QCM/QCM-D system, and acquiring a stable baseline of the resonant frequency of the quartz crystal in the QCM/QCM-D chip via the frequency counter;
    step 2: turning on the switch of the light source to irradiate light to the surface of the QCM/QCM-D chip, and obtaining the resonant frequency of the quartz crystal of the QCM/QCM-D chip as a first signal via the frequency counter;
    step 3: stopping the irradiation of the light from the light source on the surface of the QCM/QCM-D chip;
    step 4: pushing the object to be detected to the surface of the QCM/QCM-D chip, then making the light irradiate on the surface of the QCM/QCM-D chip, obtaining the resonant frequency of the quartz crystal of the QCM/QCM-D chip as a second signal via the frequency counter, and comparing the difference between the first signal and the second signal.

9. The detection method according to claim 8, wherein a grating unit is arranged between the light source and the QCM/QCM-D chip to control irradiation of light from light source on the surface of the QCM/QCM-D chip.

10. The detection method according to claim 8, wherein the detection method can be used for detection in a gas or liquid state; the reaction chamber is used for accommodating the gas or liquid in the environment in which the detection object is located and the detection object.

11. The novel light-assisted quartz crystal microbalance according to claim 7, wherein the wavelength range of the light generated by the light source is 200-400 nm.

* * * * *